US006419137B1

(12) United States Patent
Marshall et al.

(10) Patent No.: US 6,419,137 B1
(45) Date of Patent: *Jul. 16, 2002

(54) VIDEO CLIP PROGRAM GUIDE

(75) Inventors: Connie T. Marshall, Muskogee; Thomas R. Lemmons, Sand Springs; Donald W. Allison, Tulsa, all of OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,114

(22) Filed: Aug. 31, 1999

Related U.S. Application Data

(63) Continuation of application No. 08/974,939, filed on Nov. 20, 1997, now Pat. No. 6,002,444, which is a continuation of application No. 08/599,141, filed on Feb. 9, 1996, now Pat. No. 5,710,601, which is a continuation of application No. 08/246,949, filed on May 20, 1994, now Pat. No. 5,523,796.

(51) Int. Cl.[7] .............................................. H04N 5/445
(52) U.S. Cl. .......................... 225/41; 725/39; 348/906
(58) Field of Search ................................ 348/569, 563, 348/564; 725/38, 39, 41, 40, 44

(56) References Cited

U.S. PATENT DOCUMENTS

| 4,488,179 A | 12/1984 | Krüger et al. ............... 358/181 |
| 4,706,121 A | 11/1987 | Young ......................... 358/142 |
| 4,731,742 A | 3/1988 | Nishi et al. .................. 364/521 |
| 4,751,578 A | 6/1988 | Reiter et al. ................. 358/183 |

(List continued on next page.)

FOREIGN PATENT DOCUMENTS

| EP | 0 458 344 B1 | 11/1991 |
| EP | 0 624 039 A2 | 11/1994 |
| JP | 60-61935 | 9/1985 |
| WO | WO 79/00169 | 4/1979 |
| WO | WO 88/04504 | 6/1988 |
| WO | WO 95/01058 | 1/1995 |

OTHER PUBLICATIONS

"Addressable Converters: A New Development at Cable-Data," *Via Cable*, vol. 1, No. 12 (Dec. 1981).

(List continued on next page.)

*Primary Examiner*—Victor R. Kostak
(74) *Attorney, Agent, or Firm*—Fish & Neave; Pejman Sharifi

(57) ABSTRACT

A system interactively controlled by a TV viewer remote control transmitter displays, on demand by the viewer and on the viewer's display screen, descriptive data and a video clip related to a program identified on the program guide. A tuner receives TV radio frequency or optical transmission signals in a plurality of cable channels and passes a viewer usable signal of any selected one of the channels to a signal combiner. A computer receives any of a plurality of control signals from the TV viewer remote control transmitter. It also controls the tuner to pass the viewer usable signal of any selected channel in response to one of the control signals from the TV viewer remote control transmitter. It also receives and stores an input picture image signal containing local program guide data and descriptive data and video clips related to selected ones of the programs identified in the program guide data. The computer also generates an output picture image signal consisting of at least a portion of the input picture image signal. The viewer, by use of the remote, controls the computer to select the content of the output picture image signal to include the descriptive data and video clip of a selected program. The signal combiner combines the viewer usable signal of any selected channel from the tuner with output picture image signal from the computer to provide a display signal with the selected description data and video clip superimposed over the channel programming display for input to the viewer's display screen.

68 Claims, 5 Drawing Sheets

U.S. PATENT DOCUMENTS

| | | | |
|---|---|---|---|
| 4,787,063 A | 11/1988 | Muguet | 364/900 |
| 4,908,713 A | 3/1990 | Levine | 358/335 |
| 4,963,994 A | 10/1990 | Levine | 358/335 |
| 4,977,455 A | 12/1990 | Young | 358/142 |
| 4,984,083 A | 1/1991 | Okamoto et al. | 358/183 |
| 5,027,400 A | 6/1991 | Baji et al. | 380/20 |
| 5,038,211 A | 8/1991 | Hallenbeck | 358/142 |
| 5,047,867 A | 9/1991 | Strubbe et al. | 358/335 |
| 5,151,789 A | 9/1992 | Young | 358/194.1 |
| 5,231,493 A | 7/1993 | Apitz | 358/146 |
| 5,253,066 A | 10/1993 | Vogel | 358/188 |
| 5,299,006 A | 3/1994 | Kim | 348/571 |
| 5,353,121 A | 10/1994 | Young et al. | 348/563 |
| 5,412,720 A | 5/1995 | Hoarty | 380/15 |
| 5,465,385 A | 11/1995 | Ohga et al. | 455/6.1 |
| 5,479,268 A | 12/1995 | Young et al. | 358/335 |
| 5,485,221 A | 1/1996 | Banker et al. | 348/563 |
| 5,502,504 A | 3/1996 | Marshall et al. | 348/565 |
| 5,541,738 A | 7/1996 | Mankovitz | 348/906 |
| 5,583,560 A | 12/1996 | Florin et al. | 348/7 |
| 5,585,866 A | 12/1996 | Miller et al. | 348/731 |
| 5,594,509 A | 1/1997 | Florin et al. | 348/731 |
| 5,621,456 A | 4/1997 | Florin et al. | 348/7 |
| 5,659,350 A | 8/1997 | Hendricks et al. | 348/6 |
| 5,734,853 A | 3/1998 | Hendricks et al. | 395/352 |
| 5,745,710 A | 4/1998 | Clanton et al. | 345/327 |
| 5,781,246 A | 7/1998 | Alten et al. | 348/569 |
| 5,798,785 A | 8/1998 | Hendricks et al. | 348/1 |
| 5,822,123 A | 10/1998 | Davis et al. | 348/906 |
| 5,844,620 A | 12/1998 | Coleman et al. | 348/906 |

OTHER PUBLICATIONS

James Sorce et al., "Designing a Broadband Residential Entertainment Service: A Case Study," 13th International Symposium Human Factors in Telecommunications, Torino, Italy, Sep. 10–14, 1990 pp. 141–148.

Vito Brugliera, "Digital On–Screen Display—A New Technology for the Consumer Interface," *Symposium Record Cable Sessions*, 18th International Television Symposium and Technical Exhibition, Montreux, Switzerland Jun. 10–15, 1993, pp. 571–586 (Jun. 11, 1993).

CableData brochure, "A New Approach To Addressability" (undated).

Yee–Hsiang Chang et al., "An Open–Systems Approach to Video on Demand," IEEE Communications Magazine, vol. 32, pp. 68–80 (May 1994).

Matthew D. Miller, "A Scenario for the Deployment of Interactive Multimedia Cable Television Systems in the United States in the 1990's," Proceedings of the IEEE, vol. 82, pp. 585–589 (Apr. 1994).

VIDEO CLIP PROGRAM GUIDE

This is a continuation of application Ser. No. 08/974,939, filed Nov. 20, 1997 now U.S. Pat. No. 6,002,444, which is a continuation of application Ser. No. 08/599,141, filed Feb. 9, 1996, now is U.S. Pat. No. 5,710,601, which is a continuation of application Ser. No. 08/246,949, filed May 20, 1994, now U.S. Pat. No. 5,523,796.

BACKGROUND OF THE INVENTION

This invention relates generally to interactive video communications and more particularly concerns viewer controlled channel programming guide displays.

Programming guide information is presently displayed to the home TV viewer in non-interactive pages or scrolls of characters conveying programming guide information.

In present programming guide systems, video clip displays of selected program content are available only at the direction and control of the programming source and not the viewer. Unless a viewer happens to tune to the programming guide display at a time a video clip is being presented, no video clip information is available to the viewer.

It is, therefore, an object of this invention to provide a process and in-home video guide hardware by which a home viewer may interactively control a channel programming guide. Another object of this invention is to provide a process and in-home video guide hardware in which a home viewer may, at the viewer's demand, elect to view a video clip related to one or more programs identified on the channel programming guide. Another object of this invention is to provide a process and in-home video guide hardware which identifies those programs displayed on the channel programming guide for which video clips are available on request by the viewer.

SUMMARY OF THE INVENTION

In accordance with the invention, a system interactively controlled by a TV viewer remote control transmitter displays, on demand by the viewer and on the viewer's display screen, descriptive data and a video clip related to a program identified on the program guide. A tuner receives TV radio frequency or is optical transmission signals in a plurality of cable channels and passes a viewer usable signal of any selected one of the channels to a signal combiner. A computer receives any of a plurality of control signals from the TV viewer remote control transmitter. It also controls the tuner to pass the viewer usable signal of any selected channel in response to one of the control signals from the TV viewer remote control transmitter. It also receives and stores an input picture image signal containing local program guide data and descriptive data and video clips related to selected ones of the programs identified in the program guide data. The computer also generates an output picture image signal consisting of at least a portion of the input picture image signal. The viewer, by use of the remote, controls the computer to select the content of the output picture image signal to include the descriptive data and video clip of a selected program. The signal combiner combines the viewer usable signal of any selected channel from the tuner with the output picture image signal from the computer to provide a display signal with the selected descriptive data and video clip superimposed over the channel programming display for input to the viewer's display screen.

BRIEF DESCRIPTION OF THE DRAWINGS

Other objects and advantages of the invention will become apparent upon reading the following detailed description and upon reference to the drawings in which.

While the invention will be described in connection with a preferred embodiment and process, it will be understood that it is not intended to limit the invention to that embodiment or process. On the contrary, it is intended to cover all alternatives, modifications and equivalents as may be included within the spirit and scope of the invention as defined by the appended claims.

DETAILED DESCRIPTION OF THE INVENTION

Figure 1:
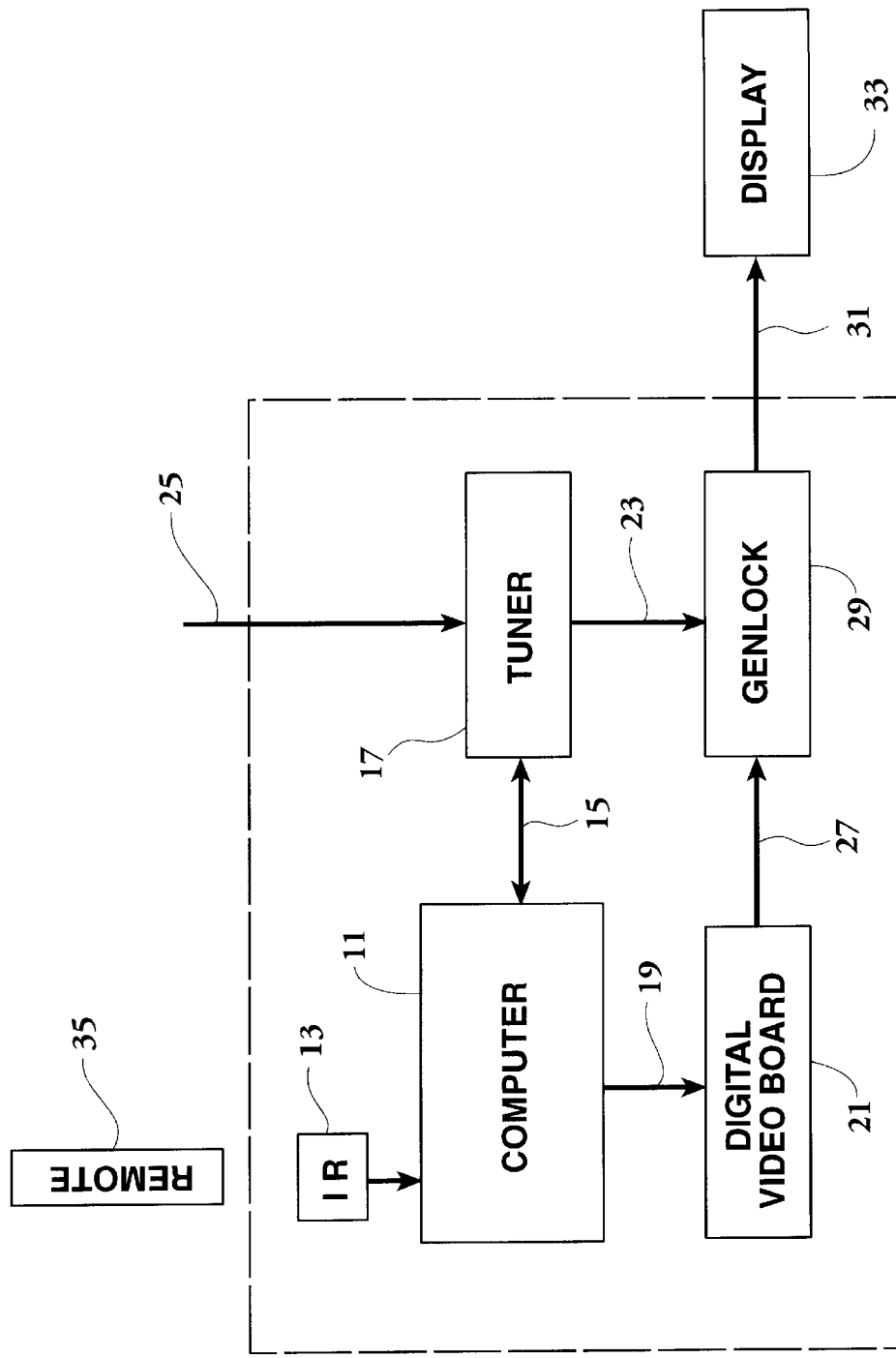
FIG. 1 is a block diagram illustrating a preferred embodiment of the hardware of the interactive program guide with descriptive data and video clip capability.

Turning first to FIG. 1, the components of the interactive program guide are illustrated. A computer 11 having a command information receiver, preferably an infrared or radio frequency receiver 13, provides a control signal 15 to a tuner 17 and a picture image signal 19 to a digital video board 21. The tuner 17 converts or demodulates radio frequencies or optical transmissions to a signal usable by the viewer to output a signal 23 selected from a plurality of signals 25 input to the tuner 17 from the cable source (not shown), typically frequency division multiplexed video, audio and data signals transmitted via a coaxial cable, over-the-air radio frequencies or fiber optics. The digital video board 21 converts digital data into a video signal. The tuner output or base programming signal 23 has superimposed thereon an information picture image signal 27 from the digital video board 21 in a genlock signal combiner or overlayer 29 to produce a video display signal 31 to the viewer's display screen 33 of the viewer's television. The information picture image signal 27 includes written description or written description and video clip segments providing a brief description and preview of one or more selected programs included in the video guide programming schedule. In each video clip segment, scenes from the selected program are provided to give the viewer an idea of the program content. An icon is displayed with the title of those programs on the programming schedule for which both descriptive information and a video clip are available. If a video clip is selected, the description and the clip will continue. The viewer sends commands to the receiver 13 to control the operation of the computer 11 and select the video clip to be displayed by the use of a remote control transmitter, preferably an infrared or radio frequency transmitter 35. The computer 11 is based on microprocessor and may utilize random access (RAM) and/or read only (ROM) memory. The software necessary to operate the microprocessor may be embedded in the device or downloaded via the cable system to the device.

Figure 3:
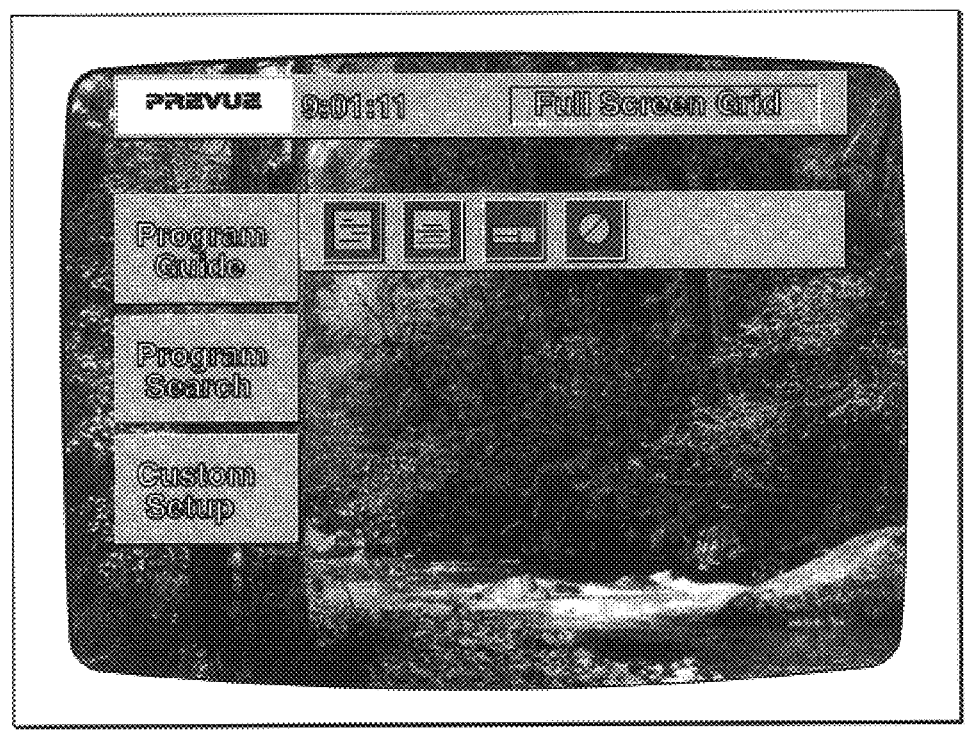
FIG. 3 is a representation of an interactive program guide main menu display permitting access to program guide data.
Figure 4:
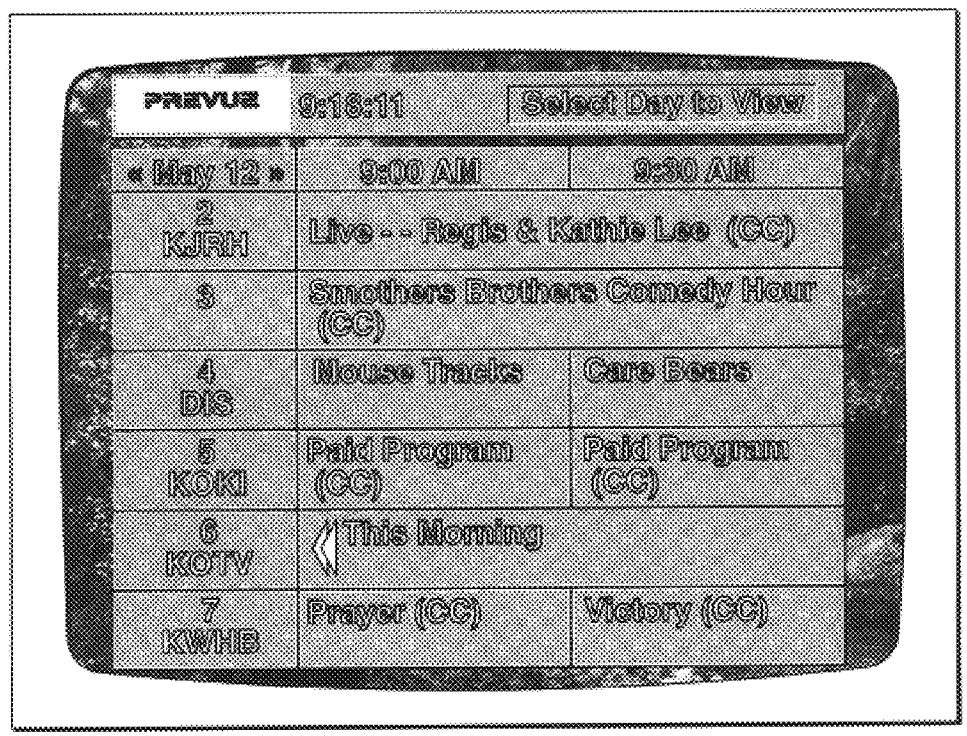
FIG. 4 is a representation of the interactive program guide data display in a mode in which the viewer may select the date of programming desired.

The above described interactive program guide components operate in response to the control of the computer 11. While the home viewer is watching programming presented on his display 33 in response to the tuner 17 feeding any basic program signal 23 from the input selections 25 to the genlock combiner 29, the viewer may opt to simultaneously view the programming guide information available to the combiner 29 from the computer 11 through the digital video board 21. The viewer simply presses a predetermined key on the remote 35 to select the "Program Guide" display. As shown in FIG. 3, the "Program Guide" nomenclature will appear on the screen with other main menu information such as "Program Search" or "Custom Setup", as shown on the screen. Preferably, and as shown, the menu automatically defaults to the "Program Guide" selection. At this juncture, the viewer presses a predetermined key on the remote 35, such as the highlight button, to enter the "Program Guide" program as is illustrated in the display of FIG. 4. Preferably, by use of up or down arrow, the viewer then selects the date for which programming is desired. As shown, the user has selected May 12 as the date of programming.

Figure 5:
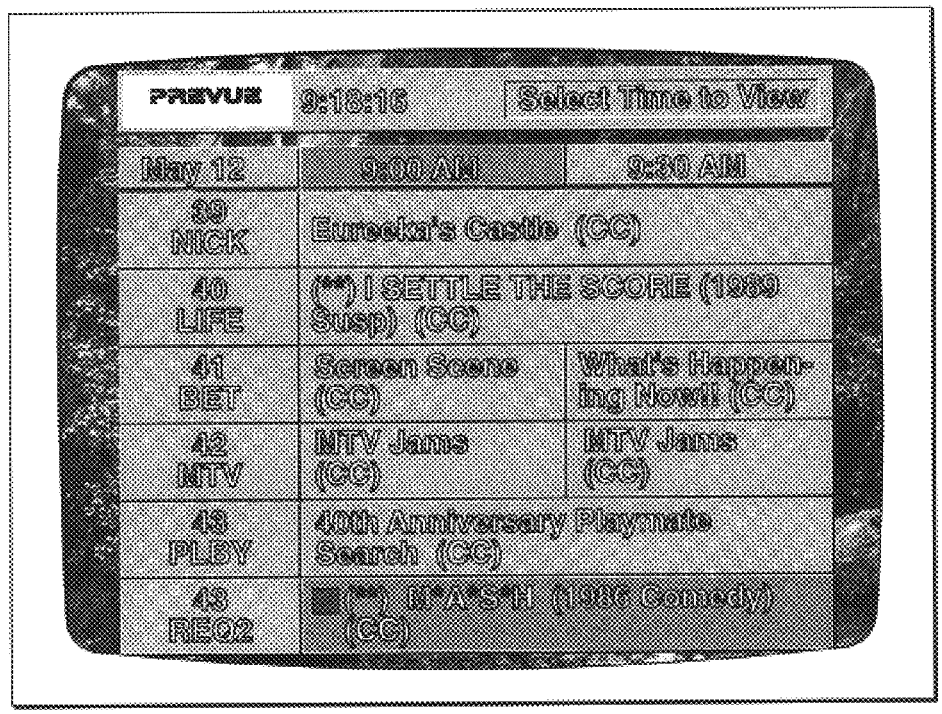
FIG. 5 is a representation of the interactive program guide data display in a mode in which the viewer may select the time of programming desired.
Figure 6:
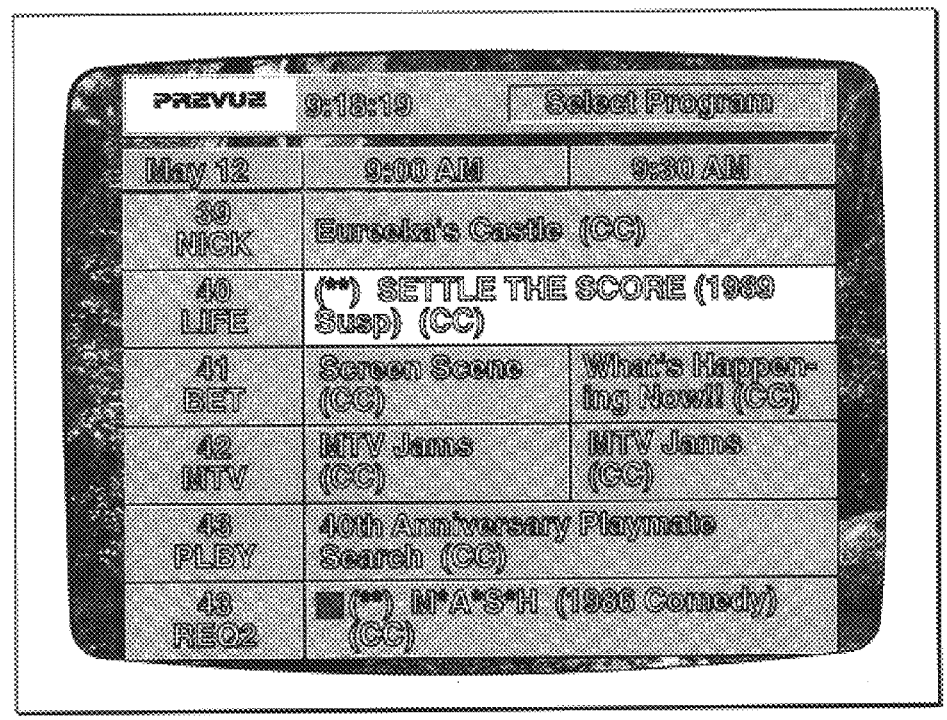
FIG. 6 is a representation of the interactive program guide data display in a mode in which the viewer may select the program desired.
Figure 7:
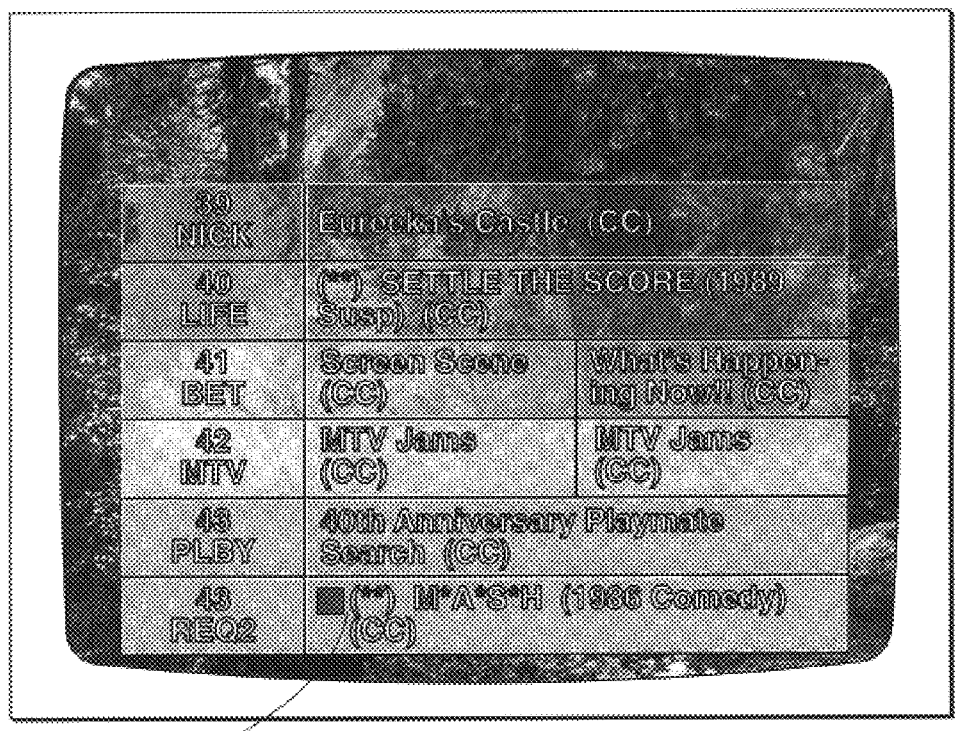
FIG. 7 is a representation of the interactive program guide data display in which the viewer has selected a program for which a video clip as well as descriptive data is available.
Figure 8:
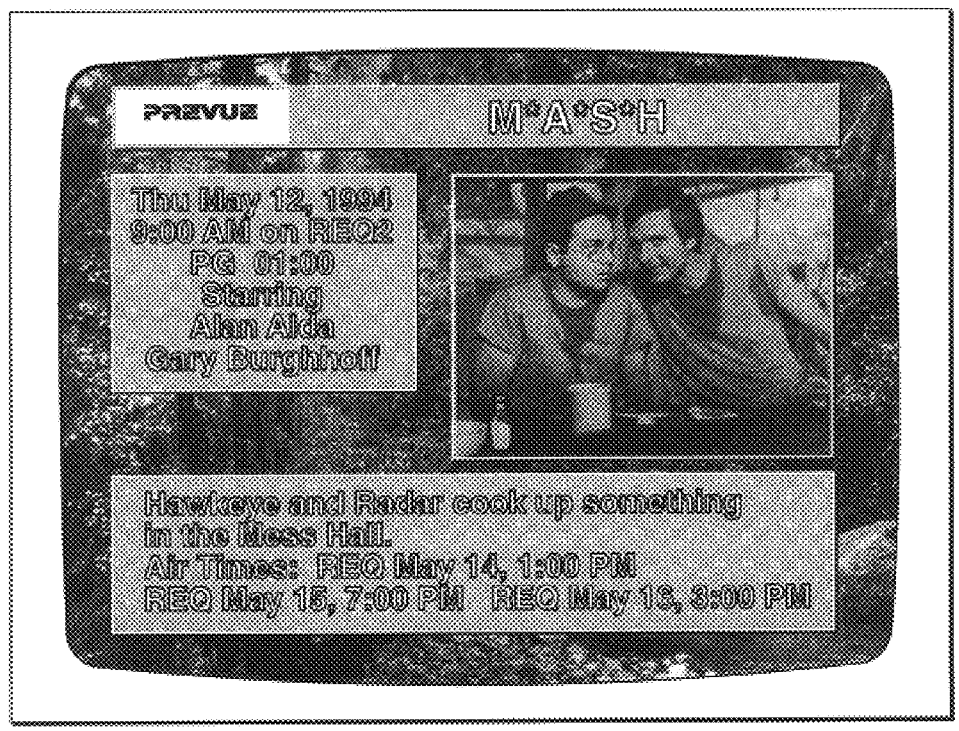
FIG. 8 is a representation of the interactive program guide data display in which the description data and video clip are displayed.

Turning to FIG. 5, the viewer next selects the time slot of programming desired, preferably by using the right arrow to sequence through the times available. The time selected will be highlighted and, as shown in FIG. 5, the viewer has selected the 9:00 a.m. time slot. By pressing another predetermined key on the remote 35, such as the highlight button, the user can now highlight or identify the program at which the guide is presently set, as shown in FIG. 6. Then, by use of predetermined keys on the remote 35, preferably the up or down arrows, the viewer can move the highlight cursor to select a program containing an icon which indicates that a video clip is available with respect to that particular program. The highlight was originally set at the program "Settle the Score" as shown in FIG. 6. In FIG. 7, the user has shifted the highlight down to the program "M*A*S*H" which includes an icon 40 indicating that a video clip is available. The viewer then presses a predetermined key on the remote 35, such as the highlight button, to cause the written description and video clip related to the selected program to be displayed on the video screen 33. This is illustrated in FIG. 8.

Figure 2:
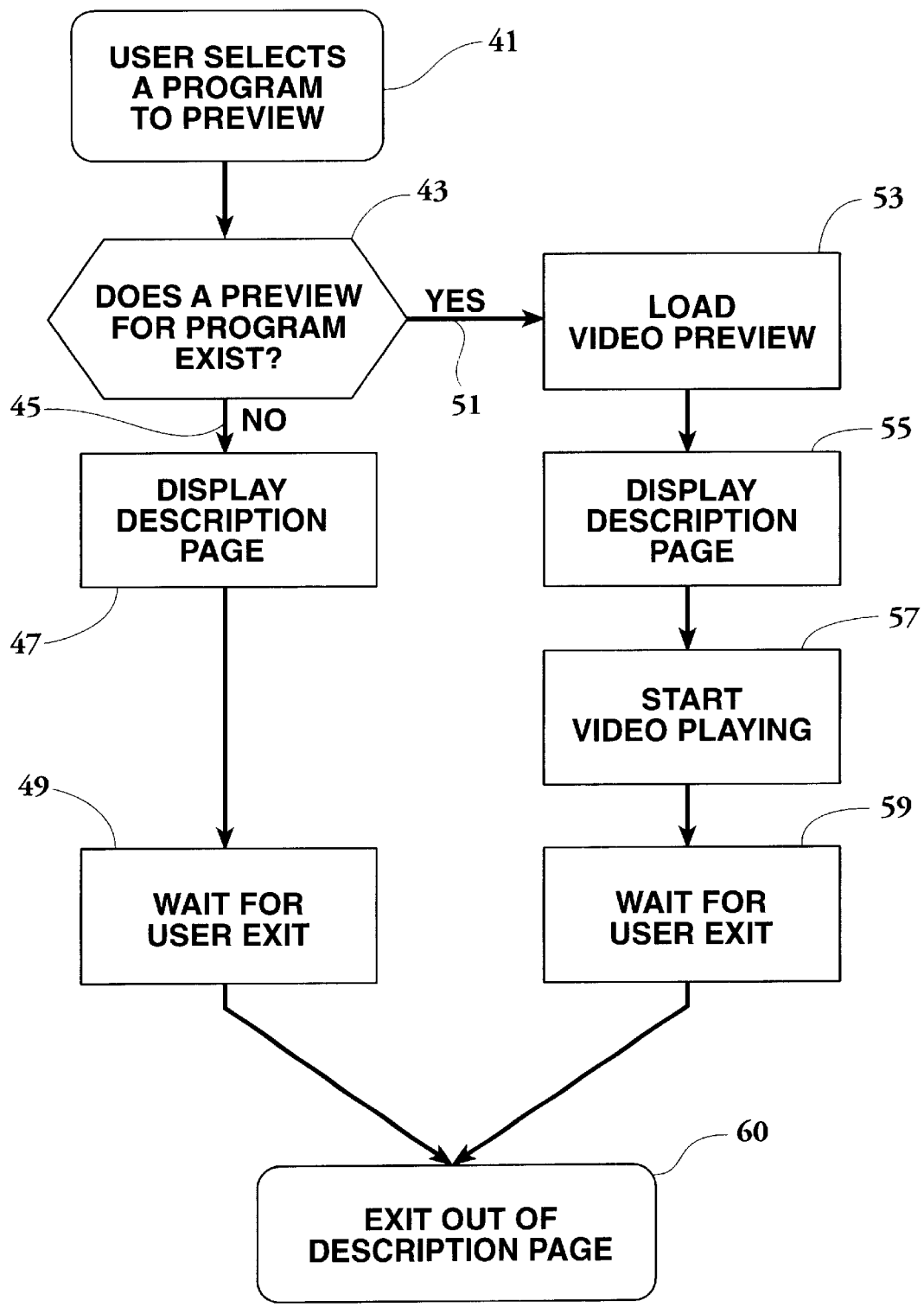
FIG. 2 is a flow chart illustrating the basic process and options of the descriptive and video clip capability of the interactive program guide.

In accomplishing this display, as shown in FIG. 2, when the viewer has selected the program to preview 41, the video clip routine of the computer 11 inquires "does a preview for program exist" 43. If the answer to this inquiry is "NO" 45, the routine proceeds is through a "display description page" 47 in which only the written description available with respect to the program is displayed. As shown, this display will continue through a "wait for user exit" period 49 until the viewer leaves this mode by pressing a predetermined key on the remote 35 such as the exit key to "exit out description page" 60. If the response to the inquiry, "does a preview for program exist" 43 is "YES" 51, the computer 11, will then "load video preview" 53 through the digital video board 21 to the genlock 29 for combination with the signal 23 from the tuner 17. The viewer's video display 33 will thne, in the "display description page" step 55 and the "start video playing step" 57, cause the video clip to be played in a continuous loop in simultaneous display with the written description. This display will continue through "wait for user exit" period 59 thus continuing the display until the viewer leaves this mode by pressing a predetermined key on the remote 35, such as the exit key to "exit out of description page" 60.

Thus, it is apparent that there has been provided, in accordance with the invention, a video s clip program guide that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A system for selecting, starting, and displaying video, comprising:

a user input device that receives user inputs; and a control unit that:

displays a program guide that includes a plurality of irregularly sized cells, the sizes of said irregularly sized cells corresponding to durations of programs identified in the irregularly sized cells, receives one of the user inputs from the user input device as a program selection of a program identified in the program guide, starts, in response to receiving the program selection, video corresponding to the program selection, and displays the video started.

2. The system of claim 1, wherein the control unit starts and displays the video substantially immediately upon receiving the program selection.

3. The system of claim 1, wherein the program guide includes an indicator that identifies that the video is available to be started and displayed.

4. The system of claim 3, wherein the indicator is in the form of an icon.

5. The system of claim 1, wherein the program guide includes a written description for the program selection.

6. The system of claim 1, wherein the control unit also simultaneously displays a written description corresponding to the program selection while displaying the video.

7. The system of claim 1, wherein the control unit also:

determines whether video is available for the program selection; and displays a written description for the program selection when no video is available.

8. The system of claim 1, wherein the control unit displays the video in a continuous loop.

9. The system of claim 1, wherein the user input device is a remote control.

10. A system for selecting, starting, and displaying video, comprising:

a user input device that receives user inputs; and a control unit that:

causes a television program to be displayed, displays a program guide that includes a plurality of pieces of program information, receives one of the user inputs from the user input device as a program selection of one of the plurality of pieces of program information, starts, in response to receiving the program selection, video corresponding to the program selection, and simultaneously displaying the video started and program information so that a portion of the television program remains displayed, wherein the program information corresponds to the program selection.

11. The system of claim 10, wherein the control unit starts and displays the video substantially immediately upon receiving the program selection.

12. The system of claim 10, wherein the program guide includes an indicator that identifies that the video is available to be started and displayed.

13. The system of claim 12, wherein the indicator is in the form of an icon.

14. The system of claim 10, wherein the program guide includes a written description for the program selection.

15. The system of claim 10, wherein the control unit also simultaneously displays a written description corresponding to the program selection while displaying the video.

16. The system of claim 10, wherein the control unit also:
   determines whether video is available for the program selection; and
   displays a written description for the program selection when no video is available.

17. The system of claim 10, wherein the control unit displays the video in a continuous loop.

18. The system of claim 10, wherein the user input device is a remote control.

19. A system for selecting, starting, and displaying video, comprising:
   a user input device that receives user inputs; and
   a control unit that:
      causes a television program to be displayed,
      displays a program guide that includes a plurality of pieces of program information,
      receives one of the user inputs from the remote control as a program selection of one of the plurality of pieces of program information,
      starts, in response to receiving the program selection, video corresponding to the program selection, and
      displays the video started so that a portion of the television program remains displayed.

20. The system of claim 19, wherein the control unit starts and displays the video substantially immediately upon receiving the program selection.

21. The system of claim 19, wherein the program guide includes an indicator that identifies that the video is available to be started and displayed.

22. The system of claim 21, wherein the indicator is in the form of an icon.

23. The system of claim 19, wherein the program guide includes a written description for the program selection.

24. The system of claim 19, wherein the control unit also simultaneously displays a written description corresponding to the program selection while displaying the video.

25. The system of claim 19, wherein the control unit also:
   determines whether video is available for the program selection; and
   displays a written description for the program selection when no video is available.

26. The system of claim 19, wherein the control unit displays the video in a continuous loop.

27. The system of claim 19, wherein the user input device is a remote control.

28. A system for selecting, starting, and displaying video, comprising:
   a user input device that receives user inputs; and
   a control unit that:
      displays a program guide that indicates a program title, a start time, and a channel for each of a plurality of television programs,
      receives one of the user inputs from the remote control as a program selection of a program indicated in the program guide,
      starts, in response to receiving the program selection, video corresponding to the program selection, and
      displays the video started.

29. The system of claim 28, wherein the control unit starts and displays the video substantially immediately upon receiving the program selection.

30. The system of claim 28, wherein the program guide includes an indicator that identifies that the video is available to be started and displayed.

31. The system of claim 30, wherein the indicator is in the form of an icon.

32. The system of claim 28, wherein the program guide includes a written description for the program selection.

33. The system of claim 28, wherein the control unit also simultaneously displays a written description corresponding to the program selection while displaying the video.

34. The system of claim 28, wherein the control unit also:
   determines whether video is available for the program selection; and
   displays a written description for the program selection when no video is available.

35. The system of claim 28, wherein the control unit displays the video in a continuous loop.

36. The system of claim 28, wherein the user input device is a remote control.

37. A method for selecting, starting, and displaying video, comprising:
   receiving user inputs;
   displaying a program guide that includes a plurality of irregularly sized cells, the sizes of said irregularly sized cells corresponding to durations of programs identified in the irregularly sized cells;
   receiving one of the user inputs as a program selection of a program identified in the program guide;
   starting, in response to receiving the program selection, video corresponding to the program selection; and
   displaying the video started.

38. The method of claim 37, wherein the video is started and displayed substantially immediately upon receiving the program selection.

39. The method of claim 37, wherein the program guide includes an indicator that identifies that the video is available to be started and displayed.

40. The method of claim 39, wherein the indicator is in the form of an icon.

41. The method of claim 39, wherein the program guide includes a written description for the program selection.

42. The method of claim 37, further comprising simultaneously displaying a written description corresponding to the program selection while displaying the video.

43. The method of claim 37, further comprising:
   determining whether video is available for the program selection; and
   displaying a written description for the program selection when no video is available.

44. The method of claim 37, further comprising displaying the video in a continuous loop.

45. A method for selecting, starting, and displaying video, comprising:
   receiving user inputs;
   causing a television program to be displayed;
   displaying a program guide that includes a plurality of pieces of program information;
   receiving one of the user inputs as a program selection of one of the plurality of pieces of program information;

starting, in response to receiving the program selection, video corresponding to the program selection; and simultaneously displaying the video started and program information so that a portion of the television program remains displayed, wherein the program information corresponds to the program selection.

46. The method of claim 45, wherein the video is started and displayed substantially immediately upon receiving the program selection.

47. The method of claim 45, wherein the program guide includes an indicator that identifies that the video is available to be started and displayed.

48. The method of claim 47, wherein the indicator is in the form of an icon.

49. The method of claim 45, wherein the program guide includes a written description for the program selection.

50. The method of claim 45, further comprising simultaneously displaying a written description corresponding to the program selection while displaying the video.

51. The method of claim 45, further comprising:

determining whether video is available for the program selection; and displaying a written description for the program selection when no video is available.

52. The method of claim 45, further comprising displaying the video in a continuous loop.

53. A method for selecting, starting, and displaying video, comprising:

receives user inputs;

causing a television program to be displayed;

displaying a program guide that includes a plurality of pieces of program information;

receiving one of the user inputs as a program selection of one of the plurality of pieces of program information;

starting, in response to receiving the program selection, video corresponding to the program selection; and displaying the video started so that a portion of the television program remains displayed.

54. The method of claim 53, wherein the video is started and displayed substantially immediately upon receiving the program selection.

55. The method of claim 53, wherein the program guide comprises includes an indicator that identifies that the video is available to be started and displayed.

56. The method of claim 55, wherein the indicator is in the form of an icon.

57. The method of claim 53, wherein the program guide includes a written description for the program selection.

58. The method of claim 53, further comprising simultaneously displaying a written description corresponding to the program selection.

59. The method of claim 53, further comprising:

determining whether video is available for the program selection; and displaying a written description for the program selection when no video is available.

60. The method of claim 53, further comprising displaying the video in a continuous loop.

61. A method for selecting, starting, and displaying video, comprising:

receives user inputs;

displaying a program guide that indicates a program title, a start time, and a channel for each of a plurality of television programs;

receiving one of the user inputs as a program selection of a program indicated in the program guide;

starting, in response to receiving the program selection, video corresponding to the program selection; and displaying the video started.

62. The method of claim 61, wherein the video is started and displayed substantially immediately upon receiving the program selection.

63. The method of claim 61, wherein the program guide comprises includes an indicator that identifies that the video is available to be started and displayed.

64. The method of claim 63, wherein the indicator is in the form of an icon.

65. The method of claim 61, wherein the program guide includes a written description for the program selection.

66. The method of claim 61, further comprising simultaneously displaying a written description corresponding to the program selection.

67. The method of claim 61, further comprising:

determining whether video is available for the program selection; and displaying a written description for the program selection when no video is available.

68. The method of claim 61, further comprising displaying the video in a continuous loop.

* * * * *

UNITED STATES PATENT AND TRADEMARK OFFICE
CERTIFICATE OF CORRECTION

PATENT NO. : 6,419,137 B1
DATED : July 16, 2002
INVENTOR(S) : Marshall et al.

It is certified that error appears in the above-identified patent and that said Letters Patent is hereby corrected as shown below:

Title page,
Item [56], References Cited, U.S. PATENT DOCUMENTS, change
"5,231,493 A 7/1993" to -- 5,231,493 A 6/1993 --; and change
"5,502,504 A 3/1996" to -- 5,502,504 A 5/1996 --.
Item [57], ABSTRACT, change "description" to -- descriptive --.

Column 1,
Line 41, change "frequency or is optical" to -- frequency or optical --.

Column 3,
Line 53, change "proceeds is through" to -- proceeds through --.
Line 63, change "thne" to -- then --.

Column 4,
Line 6, change "video s clip" to -- video clip --.

Column 6,
Line 47, change "claim 39" to -- claim 37 --.

Column 7,
Line 45, change "guide comprises includes an" to -- guide comprises an --.

Column 8,
Line 31, change "guide comprises includes an" to -- guide comprises an --.

Signed and Sealed this

Thirteenth Day of July, 2004

JON W. DUDAS
*Acting Director of the United States Patent and Trademark Office*